United States Patent
Johnson et al.

(10) Patent No.: US 6,807,768 B2
(45) Date of Patent: Oct. 26, 2004

(54) BAIT STATION WITH SCREW-OFF CHILD-RESISTANT LID

(75) Inventors: Daniel C. Johnson, Madison, WI (US); James R. Walsh, Wauwatosa, WI (US); Scott J. Collins, Brown Deer, WI (US)

(73) Assignee: Bell Laboratories, Inc., Madison, WI (US)

(*) Notice: Subject to any disclaimer, the term of this patent is extended or adjusted under 35 U.S.C. 154(b) by 0 days.

(21) Appl. No.: 10/393,429

(22) Filed: Mar. 20, 2003

(65) Prior Publication Data

US 2004/0181996 A1 Sep. 23, 2004

(51) Int. Cl.⁷ .................................................. A01M 1/20
(52) U.S. Cl. ........................................................ 43/131
(58) Field of Search ..................... 43/131; 206/315.11; 220/300, 298, 297, 293, 281; 215/209, 222, 305

(56) References Cited

U.S. PATENT DOCUMENTS

| | | | |
|---|---|---|---|
| 1,700,517 A | | 1/1929 | Ross |
| 1,714,666 A | | 5/1929 | Gring |
| 3,286,872 A | * | 11/1966 | Burdick, Jr. ............... 220/351 |
| 3,619,934 A | | 11/1971 | Tunstall et al. |
| 3,809,276 A | * | 5/1974 | Landen ..................... 215/332 |
| 3,931,891 A | * | 1/1976 | Peppler .................... 206/538 |
| 4,035,946 A | | 7/1977 | Rapp et al. |
| 4,208,829 A | | 6/1980 | Manning |
| 4,400,904 A | | 8/1983 | Baker |
| 4,462,182 A | | 7/1984 | French |
| 4,473,162 A | * | 9/1984 | Donoghue ................ 215/209 |
| 4,658,536 A | | 4/1987 | Baker |
| 4,761,912 A | * | 8/1988 | Dyer et al. ............... 43/121 |
| 4,782,621 A | * | 11/1988 | Wissman ................... 43/131 |
| 4,793,093 A | | 12/1988 | Gentile |
| 4,837,969 A | | 6/1989 | Demarest |
| 4,840,143 A | | 6/1989 | Simon |
| 5,040,327 A | | 8/1991 | Stack et al. |
| 5,329,726 A | | 7/1994 | Thorne et al. |
| 5,357,709 A | | 10/1994 | Lin |
| 5,638,976 A | * | 6/1997 | Arnold ..................... 220/298 |
| 5,711,442 A | | 1/1998 | Kusz |
| 5,737,870 A | | 4/1998 | Thind |
| 5,782,359 A | * | 7/1998 | McAllister et al. ......... 206/538 |
| 5,943,816 A | | 8/1999 | Hyatt et al. |
| 6,036,036 A | | 3/2000 | Bilani et al. |
| 6,076,689 A | | 6/2000 | Vassallo |

(List continued on next page.)

FOREIGN PATENT DOCUMENTS

| | | | | |
|---|---|---|---|---|
| EP | 770560 A1 | * | 5/1997 | ........... B65D/50/04 |
| EP | 1 201 124 A2 | | 5/2002 | |
| EP | 1 201 124 A3 | | 10/2003 | |
| GB | 2 298 558 A | | 9/1996 | |

OTHER PUBLICATIONS

Search Report issued in European Patent 03 25 3113.

Primary Examiner—Kurt Rowan
Assistant Examiner—Joan M. Olszewski
(74) Attorney, Agent, or Firm—Stiennon & Stiennon

(57) ABSTRACT

A molded plastic base has a cylindrical side wall with three rodent access openings to passageways which lead to an internal feeding chamber containing rodent bait, the passageways providing multiple rodent feeding positions at the feeding chamber. A dome-shaped lid has finger recesses permitting the lid to be gripped and rotated with respect to the base. A latch secures the lid, for release without the need for a key. Narrow flanges extend inwardly from the lid to engage beneath outwardly protruding flanges on the upper parts of the base side wall. A portion of the base side wall is resiliently deflectable inwardly such that rotation of the lid causes a cam surface tooth to be depressed by a lid flange. Once past the tooth, the resilient side wall portion returns to its original condition locking removal of the lid until the side wall portion is depressed from the outside.

12 Claims, 3 Drawing Sheets

U.S. PATENT DOCUMENTS

| | | | |
|---|---|---|---|
| 6,082,042 A * | 7/2000 | Issitt | 43/131 |
| 6,192,621 B1 | 2/2001 | Fain | |
| 6,244,518 B1 * | 6/2001 | Pogue | 239/36 |
| 6,397,517 B1 * | 6/2002 | Leyerle et al. | 43/131 |
| 6,651,378 B2 * | 11/2003 | Baker | 43/131 |
| 2003/0085228 A1 * | 5/2003 | Oakes | 220/302 |
| 2003/0136790 A1 * | 7/2003 | McNeeley et al. | 220/793 |
| 2003/0145511 A1 * | 8/2003 | Finn et al. | 43/131 |

* cited by examiner

FIG. 4
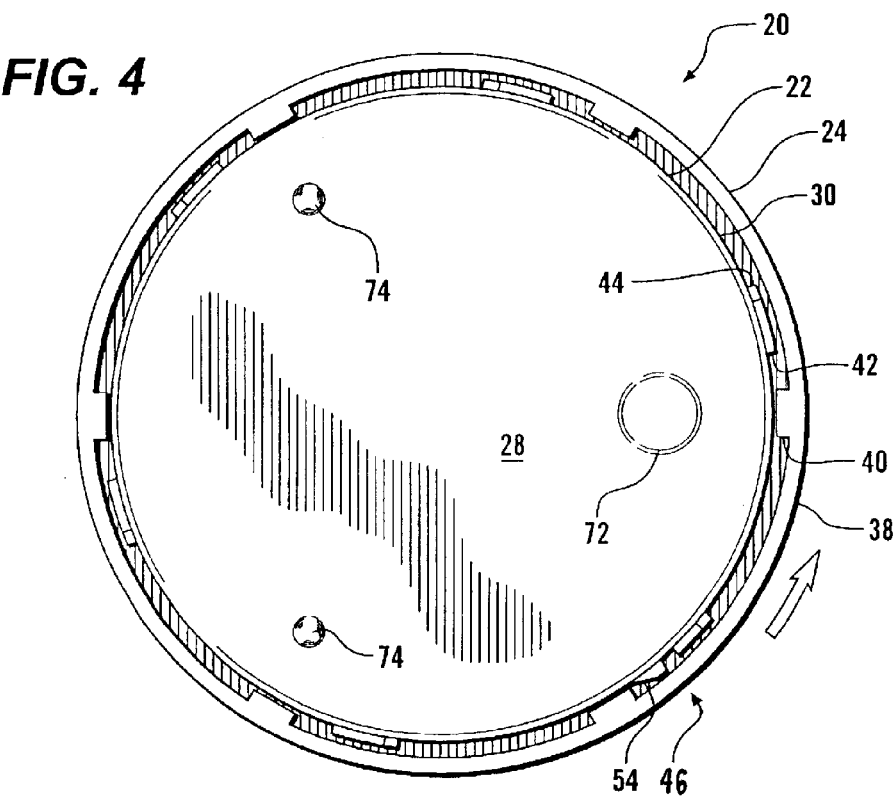
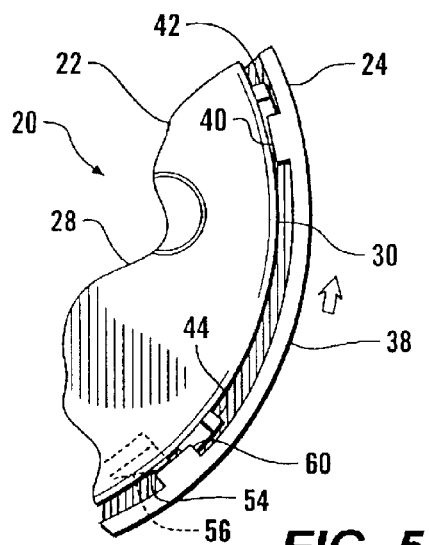
FIG. 5
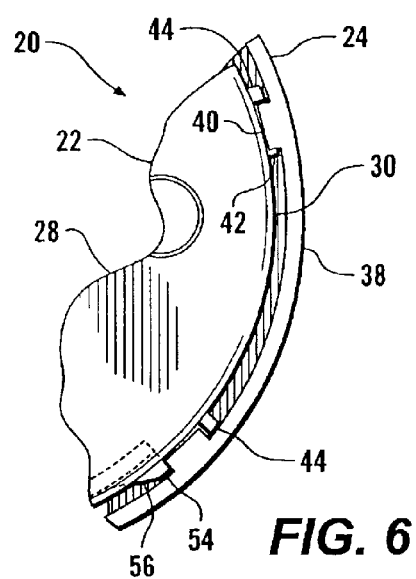
FIG. 6

BAIT STATION WITH SCREW-OFF CHILD-RESISTANT LID

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to housings for rodent bait and traps in general, and more particularly to bait stations which make poisoned bait or traps available to rodents while restricting access thereto by nontargeted animals and children.

Rodent bait stations, such as those shown in U.S. Pat. Nos. 5,040,327 and 6,397,517, provide a convenient receptacle for poisoned rodent bait or traps while at the same time mechanically restricting access to the bait by children and nontargeted animals. One known approach to limiting unauthorized access to the bait station interior is to provide a latch between the lid and base of the bait station which is openable by some type of mechanical key, for example a metal shaft having multiple projecting prongs. The latch serves to keep the lid firmly connected to the base, and the requirement for a key imposes an obstacle to access by children or other unauthorized persons.

In some situations it may be desirable to have a bait station which does not require a separate key but which is nevertheless not readily opened by a small child.

SUMMARY OF THE INVENTION

The rodent bait station of this invention has a molded plastic base with a cylindrical side wall which surrounds the base interior. Portions of the base side wall define three rodent access openings into the interior. Flanges project radially outwardly from the upper portions of the base side wall which are positioned to engage above mating flanges which extend inwardly from a plastic lid when the lid is positioned over the base. The lid is generally dome shaped with a circular peripheral skirt from which the lid flanges extend inwardly. The lid flanges are spaced circumferentially around the lid skirt, and the base flanges are spaced circumferentially around the base side wall such that in a first angular orientation the lid flanges underlie the base flanges and restrict the vertical separation of the lid from the base, while in a second angular orientation the lid flanges are spaced circumferentially from the base flanges to permit the vertical separation of the lid from the base. An L-shaped slot on the base side wall defines a deflectable locking tab with an outwardly projecting tooth. The tooth has a cam surface positioned to engage one of the lid flanges when the lid is moved between the second angular orientation to the first angular orientation. This rotation causes the lid flange to pass over the tooth and depress the locking tab. Once past the tooth, the locking tab resiliently returns to its original position blocking counter rotation of the lid until such time as the locking tab is depressed. The cover has multiple finger recesses which provide convenient gripping for an adult hand, but which can be difficult to grip for the very small fingers of a small child. The bait station exterior is symmetrical about several axes, permitting it to be disposed in a variety of positions while still providing two or more readily accessible entranceways to rodents. Moreover, the three passageways from the three entrances provide for simultaneous feeding of three rodents at the internal feeding chamber.

It is an object of the present invention to provide a rodent bait station which has a removable lid which may be latched in a fashion to restrict child access without requiring a key.

It is another object of the present invention to provide a rodent bait station which is symmetrical to allow effective rodent entry regardless of its orientation with respect to room walls.

Further objects, features and advantages of the invention will be apparent from the following detailed description when taken in conjunction with the accompanying drawings.

BRIEF DESCRIPTION OF THE DRAWINGS

FIG. 4 is a bottom plan view of the rodent bait station of FIG. 1 shown with the lid attached to the base but not latched thereto.

FIG. 5 is a fragmentary bottom plan view of the rodent bait station of FIG. 4 shown with a lid flange partially depressing the projecting tooth of the base locking tab.

FIG. 6 is a fragmentary bottom plan view of the rodent bait station of FIG.5 shown with the lid latched to the base.

DESCRIPTION OF THE PREFERRED EMBODIMENTS

Figure 1:
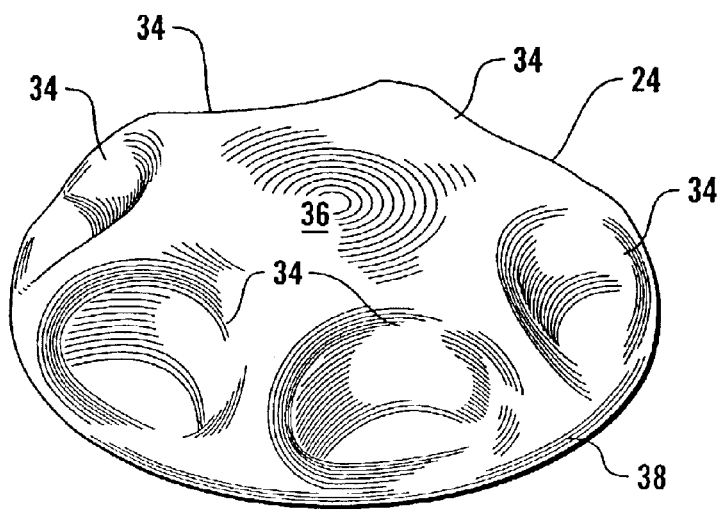
FIG. 1 is an exploded isometric view of the rodent bait station of this invention.
Figure 1:
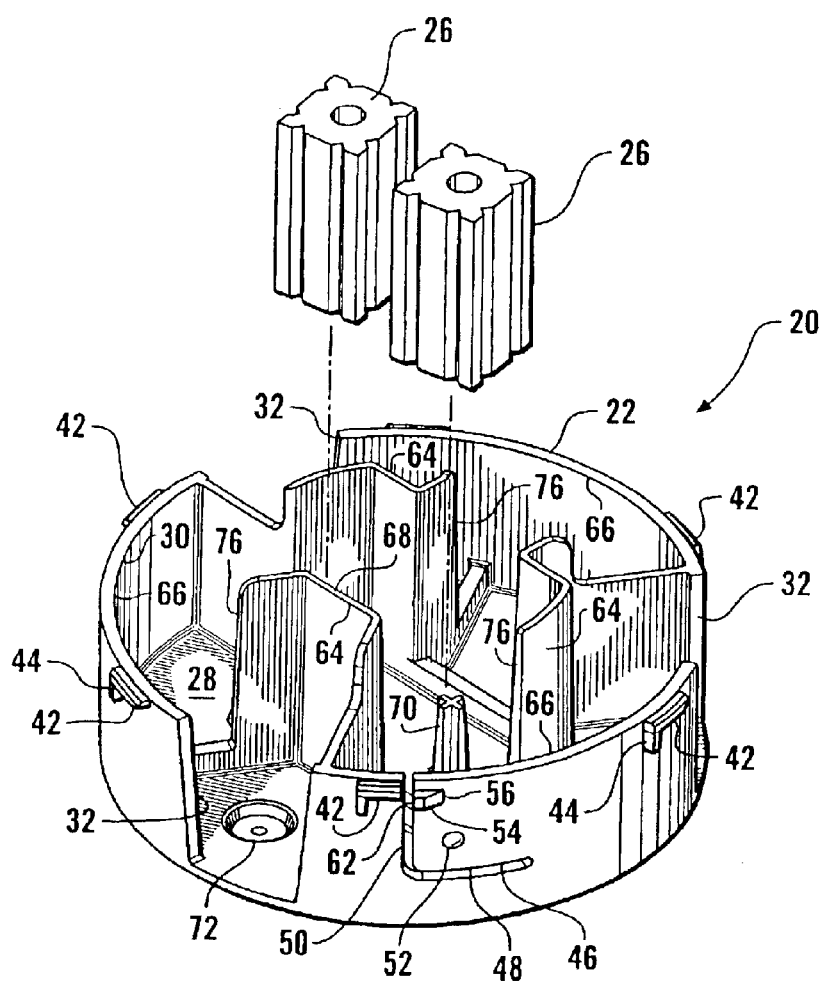

Referring more particularly to FIGS. 1–6, wherein like numbers refer to similar parts, a rodent bait station 20 is shown in FIG. 1. The bait station 20 has two components, a base 22 and a detachable lid 24. The base 22 and the lid 24 may be injection molded of plastic, for example polypropylene. The bait station 20 houses rodent bait blocks 26 such as those disclosed in U.S. Pat. No. 5,044,113, the disclosure of which is incorporated by reference herein.

The base 22 has a circular floor 28 with an upwardly extending cylindrical side wall 30 into which three rodent access openings 32 are formed. The openings 32 are preferably upwardly opening, as shown in FIG. 1. The lid 24 is generally dome shaped with a circular perimeter. The lid 24 has a top wall 36 with portions defining a downwardly extending skirt 38. The six way symmetrical lid 24 is provided with six finger recesses 34 which permit a user to firmly grip the lid for rotation about a vertical axis. The diameter of the lid may be about 4.7 inches. The large size of the grip allows the single hand of an adult user to readily engage the lid and rotate it with adequate leverage, while at the same time, the wide spacing of the finger recesses 34 may be too large for an effective grasp by a small child.

Figures 2, 3:
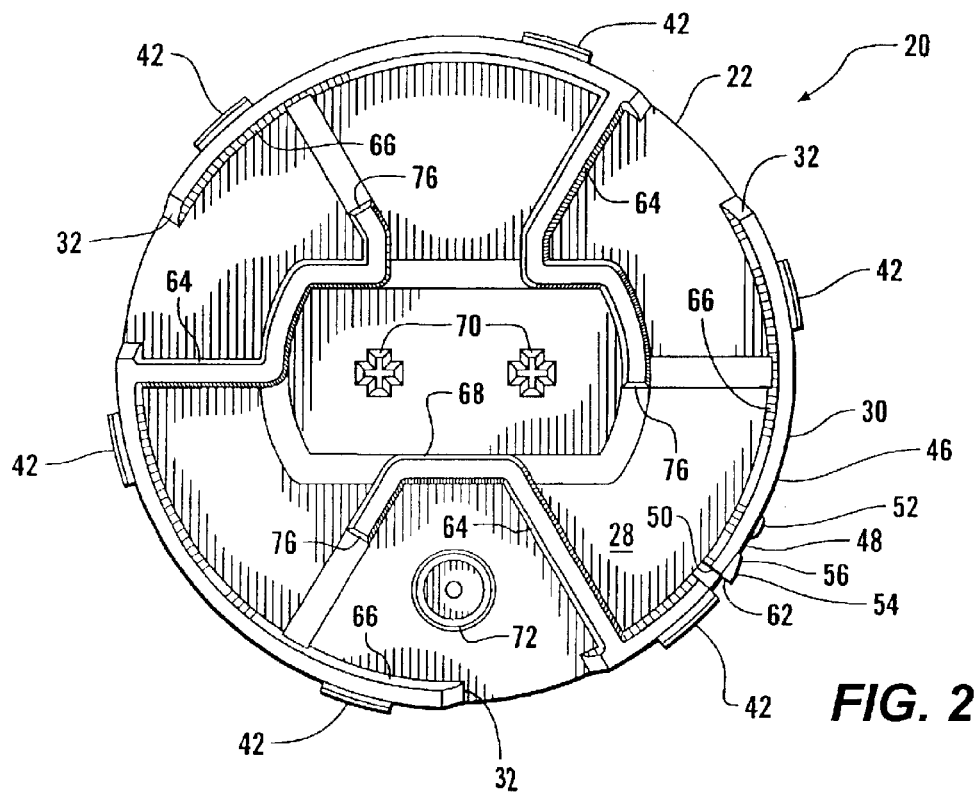
FIG. 2 is a top plan view of the base of the rodent bait station of FIG. 1.
FIG. 3 is a side elevational view of the rodent bait station of FIG. 1, with the lid shown in cross-section.

As shown in FIG. 4, six lid flanges 40 extend inwardly from the lid skirt 38 and are distributed evenly around the perimeter of the skirt 38. Each lid flange 40 is positioned beneath one of the finger recesses 34 and a horizontal shelf 35 is defined above each lid flange. As shown in FIG. 3, the lid 24, supported on the shelves 35, is rotatable on the base 22.

The base 22 has six base flanges 42 which project radially outwardly from the upper portions of the cylindrical side wall 30. Each base flange 42 may be provided with a travel limiting rib 44. The base flanges 42 are also distributed evenly around the perimeter of the base side wall 30. The base flanges 42 are not continuous with each other, and extend along only a small portion of the perimeter of the base. It will be observed that the equal spacing of the lid flanges 40 and the base flanges 42 permits the symmetrical lid to be engaged with the base in multiple orientations. The lid flanges 40 and the base flanges 42 are located on the lid 24 and base 22 such that in a first angular orientation, such as shown in FIG. 4, the lid flanges do not engage beneath the base flanges and the lid is readily lifted vertically away from the base. In a second angular orientation, such as shown in FIG. 6, the lid flanges 40 extend beneath the base flanges 42 and thereby prevent the vertical separation of the lid 24 from the base 22.

To retain the lid 24 in the second angular orientation with respect to the base 22, a latch 46 is formed by portions of the base and the lid. The latch 46 prevents the inadvertent separation of the lid 24 from the base, but also is an obstacle to removal of the lid 24 from the base 22 by nontargeted animals, such as pets, and by young children. The latch 46 is comprised of a deflectable portion of the side wall 30 which defines a rectangular locking tab 48, and an adjacent base flange 42 and one of the lid flanges 40.

As shown in FIG. 3, the locking tab 48 is defined by an L-shaped slot 50 which allows the locking tab 48 to hinge where it is cantilevered from the remainder of the cylindrical side wall 30 of the base 22. The exterior of the locking tab 48 may be indicated by a marking 52 such as a raised dot. Preferably the marking 52 will signify to a user the location of the locking tab 48, but will not be so evident that a young child will perceive its significance.

A tooth 54 protrudes radially outwardly from the locking tab 48 and is positioned to encounter a lid flange 40 when the lid 24 is rotated about the base 22. Hence the tooth 54 is positioned below the level of the base flanges 42. The projecting tooth 54 has a camming surface 56, for example an inclined ramp, as shown in FIGS. 4–6. The camming surface 56 faces the edge 60 of a lid flange when the lid is mounted to the base. As the lid flange 40 is rotated it encounters the camming surface and gradually rides over the camming surface causing the locking tab 48 to be deflected into the interior of the base 22 until the lid flange 40 passes over the projecting tooth 54, at which point the deflecting force on the locking tab is relieved, and the locking tab returns to its original position. In the original position the tooth 54, which has a stop surface 62 which extends radially substantially perpendicular to the cylindrical side wall 30, blocks counter rotation of the lid flange 40. Rotation of the lid flange 40 is restricted in the other direction by the base flange rib 44.

When it is desired to remove the lid 24 from the base 22, the locking tab 48 is depressed and held in while the lid is rotated. The depressed locking tab removes the tooth 54 from its blocking position, thereby permitting the lid flange 42 to freely pass over the depressed tooth. Once the lid flanges 42 are no longer beneath the base flanges 42, the lid may be lifted vertically and separated from the base 22.

As shown in FIG. 2, three interior barrier walls 64 extend upwardly from the bottom wall or floor 28. Each barrier wall extends inwardly from the base side wall 30 adjacent one of the rodent access openings 32. The interior barrier walls 64 define three rodent passageways 66 extending between the rodent access openings 32 and an internal feeding chamber 68. The passageways 66 are defined in the base to be upwardly open along their entire length between the rodent access opening 32 and the internal feeding chamber 68. Thus, when the lid is removed, the entire interior of the bait station 20 is revealed for better inspection and cleaning ease. At the internal feeding chamber each passageway is separated from the other passageways by portions of two interior barrier walls, one on either side. Thus, when a rodent is within a passageway, it will not block either of the two other passageways. Two molded posts 70 extended upwardly from the floor 28 within the feeding chamber 68, and serve to support the rodent bait blocks 26 for access by rodents.

Although other barrier wall patterns are possible, the pattern shown in FIG. 2 offers the advantage of allowing three rodents to simultaneously feed at the feeding chamber 68 without either rodent obstructing the access of the other two. The access openings 32 are spaced equally, about 120 degrees apart. In most instances then, the bait station 20 may be placed in a position adjacent the building wall so that at least two of the access openings 32 are unobstructed, even at a corner between two walls. The bait station 20 may be fixed in place by a fastener extending through a fastener segment 72. The fastener segment 72 along with two feet 74 support the station slightly elevated above the surface on which it is mounted to provide a stable base and to reduce the introduction of water into the station.

Although, as shown in FIG. 2, the interior barrier walls 64 divide the interior of the bait station into six sectors each of about 60 degrees, the barrier walls 64 are not identical. Each terminating wall end 76 is positioned with respect to the rodent access opening 32 which provides inlet to the rodent passageway 66 defined by the barrier wall 64, such that a straight line cannot be drawn between any part of the access opening and the internal feeding chamber 68. This arrangement makes it more difficult for a pet or child to direct its reach into the internal feeding chamber 68 to make contact with the bait contained therein. To further restrict access, the barrier walls 64, although no taller than the side wall 30 at the perimeter of the base, extend above the level of the base side wall as they surround the internal feeding chamber 68, as shown in FIG. 3.

The bait station 20 provides ready access to multiple rodents for feeding simultaneously while having a conveniently removable lid which does not require the user to carry any tool or key.

It is understood that the invention is not limited to the particular construction and arrangement of parts herein illustrated and described, but embraces all such modified forms thereof as come within the scope of the following claims.

We claim:

1. A rodent bait station having a releasably securable lid which does not require a key, the bait station comprising:

a base having flanges and a floor with an upwardly extending cylindrical side wall which defines a base interior;

portions of the base side wall which define a plurality of rodent access openings into the base interior;

a lid having flanges which is positionable to overlie the base and which has a top wall with a downwardly extending skirt, the lid being rotatable on the base between a first latched orientation and a second orientation which permits the vertical displacement and separation of the lid from the base, wherein said base flanges protrude to engage the lid flanges to restrain separation of the engaged lid from the base in the first orientation;

a plurality of interior barrier walls which extend upwardly from the floor of the base to define an internal feeding chamber in the base interior which is accessible from the rodent access openings, wherein the interior barrier walls define a plurality of rodent passageways which extend between the rodent access openings and the internal feeding chamber; and a locking tab extending from the base side wall and having a tooth with a camming surface separated from one of said base flanges by an upwardly extending slot such that the deflection of the tooth inwardly allows relative rotation between the base and the lid, such that in the first orientation the lid is restrained from rotation until such time as force is applied to the locking tab to allow said rotation, the latch being operable without the use of a key.

2. The rodent bait station of claim 1 wherein each barrier wall extends inwardly from the base side wall adjacent one of the rodent access openings to define at least three rodent passageways extending between the rodent access openings and the internal feeding chamber.

3. The rodent bait station of claim 1 wherein portions of the lid define a plurality of finger recesses positioned around the lid.

4. The rodent bait station of claim 1 wherein there are three rodent passageways, and wherein each rodent passageway is connected to the internal feeding chamber, and wherein at the internal feeding chamber each passageway is separated from the other passageways by two interior barrier walls.

5. A rodent bait station comprising:
   a base having a cylindrical side wall surrounding a base interior;
   portions of the base side wall which define a plurality of rodent access openings into the base interior;
   a plurality of radially outwardly projecting base flanges which project from the base side wall;
   a lid having a top wall with a downwardly extending peripheral skirt, the lid being positionable to overlie and mate with the base;
   a plurality of lid flanges which project radially inwardly from the lid skirt, wherein the lid flanges are spaced circumferentially around the lid skirt, and the base flanges are spaced circumferentially around the base side wall such that in a first angular orientation the lid flanges underlie the base flanges and restrict the vertical separation of the lid from the base, and in a second angular orientation the lid flanges are spaced circumferentially from the base flanges to permit the vertical separation of the lid from the base; and
   portions of the base side wall which define an inwardly deflectable locking tab having an outwardly projecting tooth, the tooth having a cam surface and separated from one of said base flanges by a upwardly extending slot, the cam being positioned to engage one of the lid flanges when the lid is moved between the second angular orientation to the first angular orientation, the rotation causing said one lid flange to pass over the tooth and depress the locking tab, the locking tab returning to its undepressed position when the lid is in the first angular orientation, the tooth in the first angular orientation preventing the rotation of the lid with respect to the base until such time as the locking tab is depressed inwardly.

6. The rodent bait station of claim 5, wherein the base has a bottom wall, and further comprising at least three interior barrier walls extending upwardly from the bottom wall, each barrier wall extending inwardly from the base side wall adjacent one of the rodent access openings to define at least three rodent passageways extending between the rodent access openings and an internal chamber.

7. The rodent bait station of claim 6 wherein there are three rodent passageways, and wherein each rodent passageway is connected to the internal feeding chamber, and wherein at the internal feeding chamber each passageway is separated from the other passageways by two interior barrier walls.

8. A rodent bait station comprising:
   a base having flanges and a floor with an upwardly extending cylindrical side wall which defines a base interior;
   portions of the base side wall which define a plurality of rodent access openings into the base interior;
   a lid having flanges which overlies the base and which has a top wall with a downwardly extending skirt;
   a plurality of interior barrier walls which extend upwardly from the floor of the base to define an internal feeding chamber in the base interior which is accessible from the rodent access openings, wherein the interior barrier walls define a plurality of rodent passageways which extend between the rodent access openings and the internal feeding chamber;
   said lid flanges extend into engagement with said base flanges in a first orientation to secure the lid from vertical separation from the base, and in a second orientation are spaced from said base flanges to permit the vertical separation of the lid from the base; and
   a portion of the base side wall being formed as an inwardly deflectable tab having an outwardly directed tooth containing a camming surface, said tooth being separated from one of the base flanges by and upwardly extending slot such that inward deflection of the tab and the tooth allows for movement of the lid from the first orientation to the second orientation.

9. The rodent bait station of claim 8 wherein the plurality of interior barrier walls comprises three interior barrier walls extending upwardly from the bottom wall, each barrier wall extending inwardly from the base side wall adjacent one of the rodent access openings to define at least three rodent passageways extending between the rodent access openings and the internal feeding chamber.

10. The rodent bait station of claim 8 wherein portions of the lid define a plurality of finger recesses positioned around the lid.

11. The rodent bait station of claim 8 wherein the tab is defined by said upwardly extending slot which is joined by a horizontal slot forming a L-shape which extends on two sides of said inwardly deflectable tab wherein said cam surface engages portions of the lid when the lid is moved from the second orientation to the first orientation, the rotation causing said lid portions to pass over the tooth and depress the locking tab, the locking tab returning to its undepressed position when the lid is in the first orientation, the tooth in the first orientation preventing the rotation of the lid with respect to the base until such time as the locking tab is depressed.

12. The rodent bait station of claim 8 wherein there are three rodent passageways, and wherein each rodent passageway is connected to the internal feeding chamber, and wherein at the internal feeding chamber each passageway is separated from the other passageways by two interior barrier walls.

* * * * *